United States Patent
Grah et al.

(10) Patent No.: US 8,362,134 B2
(45) Date of Patent: Jan. 29, 2013

(54) FILM COMPRISING SILICATE PLATELETS OF EXFOLIATED FROM PHOSPOLIPID-INTERCALATED LAYERED SILICATE

(75) Inventors: Michael D. Grah, Greenville, SC (US); Gary W. Beall, San Marcos, TX (US)

(73) Assignee: Cryovac, Inc., Duncan, SC (US)

( * ) Notice: Subject to any disclaimer, the term of this patent is extended or adjusted under 35 U.S.C. 154(b) by 793 days.

(21) Appl. No.: 11/990,614

(22) PCT Filed: Aug. 15, 2006

(86) PCT No.: PCT/US2006/031889
§ 371 (c)(1),
(2), (4) Date: Jul. 13, 2009

(87) PCT Pub. No.: WO2007/024576
PCT Pub. Date: Mar. 1, 2007

(65) Prior Publication Data
US 2009/0297675 A1    Dec. 3, 2009

Related U.S. Application Data

(60) Provisional application No. 60/710,015, filed on Aug. 19, 2005.

(51) Int. Cl.
- *C01B 33/44* (2006.01)
- *B65D 65/40* (2006.01)
- *C08K 5/52* (2006.01)

(52) U.S. Cl. ........ 524/447; 524/445; 524/136; 524/140; 206/524.2

(58) Field of Classification Search ............... 524/115, 524/140, 445, 136, 447
See application file for complete search history.

(56) References Cited

U.S. PATENT DOCUMENTS

| | | | |
|---|---|---|---|
| 4,157,375 A | 6/1979 | Brown et al. | |
| 4,506,048 A | 3/1985 | Bush et al. | |
| 4,843,048 A | 6/1989 | House et al. | |
| 4,931,195 A | 6/1990 | Cao et al. | |
| 4,960,740 A | 10/1990 | House et al. | |
| 5,336,507 A | 8/1994 | Na et al. | |
| 5,470,583 A | 11/1995 | Na et al. | |
| 5,858,933 A | 1/1999 | Nikoloff | |
| 6,057,035 A | 5/2000 | Singh et al. | |
| 6,156,835 A * | 12/2000 | Anderson et al. | 524/445 |
| 6,287,992 B1 | 9/2001 | Polansky et al. | |
| 6,861,392 B2 | 3/2005 | Shaarpour | |
| 6,890,872 B2 | 5/2005 | Bond et al. | |
| 2003/0186819 A1 | 10/2003 | Shaarpour | |
| 2004/0223931 A1 | 11/2004 | Mondet et al. | |

FOREIGN PATENT DOCUMENTS

CZ      263659      8/1989
(Continued)

OTHER PUBLICATIONS

Kanzaki et al. Langmuir 1993, 9, 1930-1931.*
Bentonite Clay: http://www.mountainroseherbs.com/learn/bentonite.php (Jan. 4, 2012).*
(Continued)

*Primary Examiner* — Vu A Nguyen
(74) *Attorney, Agent, or Firm* — Daniel B. Ruble

(57) ABSTRACT

A packaging film comprises a dispersed-particle composition, which comprises a plurality of particles dispersed in a matrix medium of thermoplastic polymer. The particles comprise silicate platelets. Intercalating agent of one or more phospholipids is sorbed to the silicate platelets.

28 Claims, 4 Drawing Sheets

FOREIGN PATENT DOCUMENTS

| | | |
|---|---|---|
| JP | 63041508 A | 2/1988 |
| JP | 2-267114 | 10/1990 |
| JP | 3515595 B2 | 4/2004 |
| WO | WO 98/23251 | 9/1999 |
| WO | WO 99/54393 | 10/1999 |

OTHER PUBLICATIONS

Murase, Norio et al "Adsorption of Liposomes by Clay," Journal of Biochemistry, Feb. 1982, vol. 92 (1) pp. 271-273.

* cited by examiner

FILM COMPRISING SILICATE PLATELETS OF EXFOLIATED FROM PHOSPOLIPID-INTERCALATED LAYERED SILICATE

This application claims the benefit of U.S. Provisional Application No. 60/710,015 filed Aug. 19, 2005, which is incorporated herein in its entirety by reference.

BACKGROUND

The present invention relates to dispersed-particle compositions comprising silicate platelets exfoliated from intercalated layered silicates, and also to packaging films incorporating such compositions.

Because of the toxic nature of many quaternary ammonium-based intercalating agents, it may be difficult to obtain government agency approval to utilize them in some end-use applications, such as food-contacting materials.

SUMMARY

One or more embodiments of the present invention may address one or more of the aforementioned problems. In an aspect of the invention, a packaging film may comprise at least one layer comprising a dispersed-particle composition. The dispersed-particle composition may comprise a matrix medium comprising one or more thermoplastic polymers and a plurality of particles dispersed in the matrix medium. The particles may comprise silicate platelets and intercalating agent sorbed to the silicate platelets. The intercalating agent may comprise one or more phospholipids.

In another aspect of the invention, a packaging film may be made by forming an intercalated layered silicate comprising a layered silicate and one or more intercalating agents sorbed between the layers of the layered silicate. The one or more intercalating agents may be selected from one or more phospholipids. From about 0.1 to about 100 weight parts of the intercalated layered silicate may be mixed with 100 weight parts of a matrix medium comprising one or more thermoplastic polymers to form a mixture. Sufficient energy may be added to the mixture to form a dispersed-particle composition comprising at least about 0.1 weight parts exfoliated particles per 100 weight parts matrix medium. A film may be formed comprising the dispersed-particle composition.

In another aspect of the invention, a dispersed-particle composition may comprise a matrix medium comprising one or more energy curable polymer precursors. A plurality of particles may be dispersed in the matrix medium. The particles may comprises silicate platelets and intercalating agent sorbed to the silicate platelets. The intercalating agent may comprise one or more phospholipids. In still another aspect of the invention, a cured dispersed-particle composition may be formed by exposing this dispersed-particle composition to an amount of energy effective to substantially cure the energy curable polymer precursors.

Additional aspects and embodiments of the invention will be more readily understood and appreciated by reference to the drawings and detailed description below.

DETAILED DESCRIPTION

Figure 1:
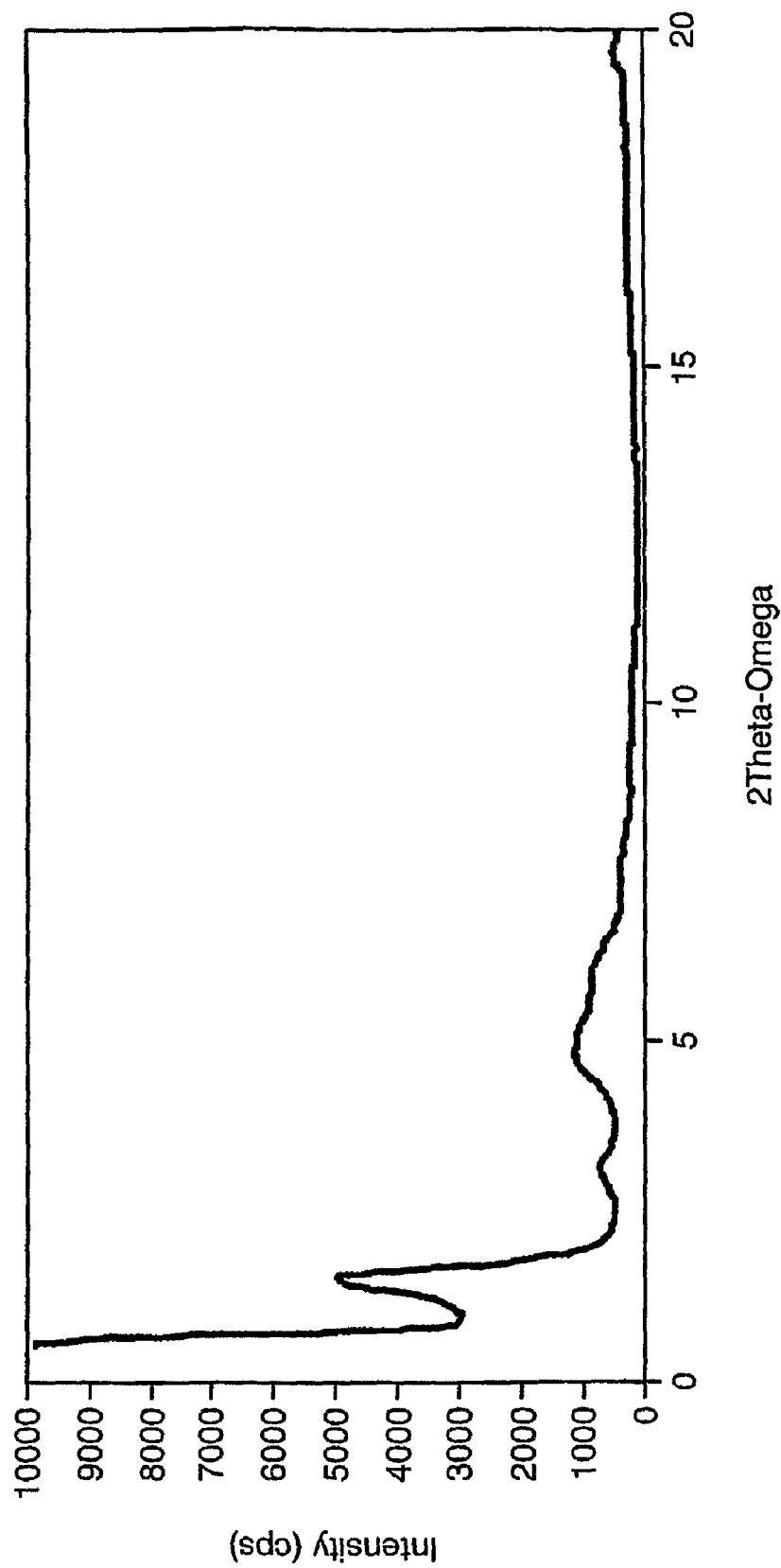
FIG. 1 is an X-ray diffraction pattern for montmorillonite clay intercalated with lecithin, as discussed in Example 1.

An intercalated layered silicate comprises a layered silicate comprising a plurality of silicate layers. One or more phospholipid intercalating agents are sorbed between the silicate layers in an amount effective to provide an average interlayer spacing between the silicate layers of at least about 20 Å. A dispersed-particle composition may be formed comprising a matrix medium and dispersed, exfoliated silicate platelets derived from the intercalated layered silicate.

Layered Silicate

The intercalated layered silicate comprises a layered silicate. The layered silicate (i.e., phyllosilicate) may be naturally occurring or synthetically derived. Exemplary layered silicates include:

1. Natural clays such as smectite clays, for example, bentonite clays (e.g., montmorillonite, hectorite), mica, vermiculite, nontronite, beidellite, volkonskoite, and saponite;

2. Layered polysilicates (e.g., layered silicic acid), such as kanemite, makatite, ilerite, octosilicate, magadiite, and kenyaite; and 3. Synthetic clays, such as, synthetic silicates, synthetic mica, synthetic saponite, synthetic laponite, and synthetic hectorite.

Layered silicates comprise a plurality of silicate layers, that is, a laminar structure having a plurality of stacked silicate sheets or layers with a variable interlayer distance between the layers. For example, the layered silicate may have a 2:1 layer structure typified by a central octahedral layer, comprising aluminum oxide sandwiched between two tetrahedral silicate layers. The aluminum of the oxide may also be substituted by any of magnesium, iron, chromium, manganese, or lithium. When substitutions occur between ions of unlike charge, excess negative charge may develop on the corresponding part of the silicate structure. This excess negative charge may be compensated by a positive ion such as Na+ that associates with that area on the silicate. The layers of the layered silicate may be turbostratic relative to each other, such that the layered silicate may be swellable, for example, in water. The average thickness of the silicate layers may be at least about any of the following: 3, 5, 8, 10, 15, 20, 30, 40, and 50 Å; and at most about any of the following: 60, 50, 45, 35, 25, 20, 15, 12, 10, 8, and 5 Å. For example, many layered silicates have a silicate layer thickness ranging from 8 to 11 Å.

The average interlayer spacing of the layered silicate at 60% relative humidity before intercalation with the intercalating agent may be at least about any of the following: 1, 2, 3, 4, 5, 6, 8, and 10 Å; and may be at most about any of the following: 20, 15, 10, 8, 6, 5, 3, and 2 Å.

The average interlayer spacing (i.e., the gallery spacing) of a layered silicate (including an intercalated layered silicate) refers to the distance between the internal faces of the non-exfoliated, adjacent layers of representative samples of the layered silicate. The interlayer spacing may be calculated using standard powder wide angle X-ray diffraction techniques generally accepted in the art in combination with Bragg's law equation, as is known in the art.

Useful layered silicates are available from various companies including Nanocor, Inc., Southern Clay Products, Kunimine Industries, Ltd., Elementis Pigments, and Rheox.

Intercalating Agent

The intercalated layered silicate comprises at least one intercalating agent sorbed between the silicate layers of the layered silicate. The term "sorbed" in this context means inclusion within the layered silicate (for example, by adsorption and/or absorption) without covalent bonding. An intercalating agent that is sorbed between silicate layers may be held to the interlayer surface of a silicate layer by one or more of ionic complexing, electrostatic complexing, chelation, hydrogen bonding, ion-dipole interaction, dipole-dipole interaction, and van der Waals forces.

The intercalating agent may comprise one or more phospholipids (also known as phosphatides), such as one or more nitrogen-containing and/or sulphur-containing phosphoglycerides (i.e., glycerolphosphatides or glycerophospholipids). For example, intercalating agent may comprise one or more of any of choline glycerophospholipids, sulfocholine glycerophospholipids, ethanolamine phospholipids, and ether lipids.

The phosphoglycerides that may be used as intercalating agents include those represented by formula I.

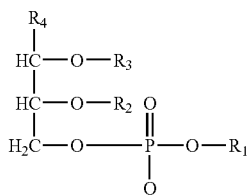
(I)

$R_1$ represents a quaternized amino group represented by formula II:

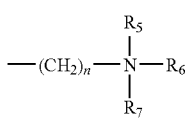
(II)

where $R_5$, $R_6$, and $R_7$ each independently represent hydrogen or alkyl of 1 to 4 carbon atoms and n is an integer of from 2 to 6;
or a sulphur group represented by formula III:

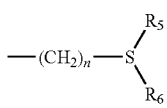
(III)

where $R_5$ and $R_6$ each independently represent hydrogen or alkyl of 1 to 4 carbon atoms and n is an integer of from 2 to 6.

$R_2$ and $R_3$ are independently hydrogen, an acyl group having 2 carbon atoms, an alkyl, alkenyl, or alkadienyl group having from 14 to 20 carbon atoms, or the acyl residue of long chain fatty acid, provided that at least one of $R_2$ and $R_3$ is acyl residue of long chain fatty acid.

$R_4$ is hydrogen or a lower alkyl or lower alkenyl group.

As used herein the term "lower alkyl" or "lower alkenyl" includes alkyl or alkenyl groups with from 1 to 5 carbon atoms, such as methyl, ethyl, propyl, butyl, isobutyl, and propenyl. The term "long chain fatty acid" refers to saturated or unsaturated fatty carboxylic acids having from 8 to 22 carbon atoms, for example, any of at least 8, 10, or 12 carbon atoms, and any of at most 18, 20, and 22 carbon atoms. For example, such fatty carboxylic acids may have one or two sites of unsaturation. The long chain fatty acids, and the acyl residue of same, may include mixtures of such carbon chain lengths; so that in the above formulation $R_3$ and $R_4$ may be the acyl residue of the same or different fatty acids.

Choline Glycerophospholipids

The intercalating agent may comprise one or more choline glycerophospholipids, for example, choline glycerophospholipids represented by formula I where $R_1$ is represented by formula II in which $R_5$, $R_6$, and $R_7$ are each a methyl group, and n is equal to 2. For example, the intercalating agent may comprise one or more of any of the following choline glycerophospholipids:

1. Diacyl derivatives of choline glycerophospholipids, for example, phosphatidylcholine (i.e., lecithin or 1,2-diacyl-sn-glycero-3-phosphorylcholine), which may be represented by formula I where $R_2$ and $R_3$ are both independently acyl residues of long chain fatty acid, $R_4$ is hydrogen, and $R_1$ is represented by formula II where $R_5$, $R_6$, and $R_7$ are each a methyl group, and n is equal to 2;

2. Monoacyl derivatives of choline glycerophospholipids, for example:
    a) 1-lysophosphatidylcholine, which may be represented by formula I where $R_2$ is an acyl residue of long chain fatty acid, $R_3$ is hydrogen, $R_4$ is hydrogen, and $R_1$ is represented by formula II where $R_5$, $R_6$, and $R_7$ are each a methyl group, and n is equal to 2; and
    b) 2-lysophosphatidylcholine, which may be represented by formula I—where $R_3$ is an acyl residue of long chain fatty acid, $R_2$ is hydrogen, $R_4$ is hydrogen, and $R_1$ is represented by formula II where $R_5$, $R_6$, and $R_7$ are each a methyl group, and n is equal to 2;

3. Alkenyl, acyl derivatives of choline glycerophospholipids, for example, choline plasmalogens (i.e., 1-alk-1'-enyl-, 2-acyl-sn-glycero-3-phosphorylchorine), which may be represented by formula I where $R_2$ is an acyl residue of long chain fatty acid, $R_3$ is an alkenyl group comprising from 14 to 20 carbons and having the unit of unsaturation adjacent the ether bond to form a vinyl ether bond, $R_4$ is hydrogen, and $R_1$ is represented by formula II where $R_5$, $R_6$, and $R_7$ are each a methyl group, and n is equal to 2;

4. Alkyl, acyl derivatives of choline glycerophospholipids, for example, 1-alkyl-, -2-acyl-sn-glycero-3-phosphorylcholine, which may be represented by formula I where $R_2$ is an acyl residue of long chain fatty acid, $R_3$ is an alkyl group comprising from 14 to 20 carbons, $R_4$ is hydrogen, and $R_1$ is represented by formula II where $R_5$, $R_6$, and $R_7$ are each a methyl group, and n is equal to 2; and 5. Acetyl derivatives of choline glycerophospholipids, for example, 1-alkyl-, -2-acetyl-sn-glycero-3-phosphocholine (i.e., platelet activating factor or PAF), which may be represented by formula I where $R_2$ is an acyl group having two carbon atoms, $R_3$ is an alkyl or alkenyl group comprising from 14 to 20 carbons, $R_4$ is hydrogen, and $R_1$ is represented by formula II where $R_5$, $R_6$, and $R_7$ are each a methyl group, and n is equal to 2.

Sulfocholine Glycerophospholipids

The intercalating agent may comprise one or more sulfocholine glycerophospholipids, for example, represented by formula I where $R_1$ is represented by formula III. For example, the intercalating agent may comprise one or more phosphatidylsulfocholines, which may be represented by formula I where $R_2$ and $R_3$ are both independently acyl residues of long chain fatty acid, $R_4$ is hydrogen, and $R_1$ is represented by formula III where $R_5$ and $R_6$ are each a methyl group, and n is equal to 2.

Ethanolamine Phospholipids

The intercalating agent may comprise one or more ethanolamine phospholipids, for example, ethanolamine glycerophospholipids, for example those represented by formula I where $R_1$ is represented by formula II in which $R_5$, $R_6$, and $R_7$ are each hydrogen (i.e., where the ethanolamine glycerophospholipid is a zwitterion, e.g., where the pH ranges from 2 to 7) and n is equal to 2. For example, the intercalating agent may comprise one or more of any of the following ethanolamine glycerophospholipids:

1. Diacyl derivatives of ethanolamine glycerophospholipids, for example, phosphatidylethanolamine (i.e., cephalin or 1,2-diacyl-sn-glycero-3-phosphorylethanolamine), which may be represented by formula I where $R_2$ and $R_3$ are both independently acyl residues of long chain fatty acid, $R_4$ is hydrogen, and $R_1$ is represented by formula II where $R_5$, $R_6$, and $R_7$ are each hydrogen (i.e., in the zwitterion form, e.g., where the pH ranges from about 2 to about 7), and n is equal to 2;

2. Alkenyl, acyl derivatives of ethanolamine glycerophospholipids, for example, ethanol amine plasmalogens (i.e., 1-alkyl-, 2-acyl-sn-glycero-3-phosphorylethanolamine), which may be represented by formula I where $R_2$ is an acyl residue of long chain fatty acid, $R_3$ is an alkenyl group comprising from 14 to 20 carbons and having the unit of unsaturation adjacent the ether bond to form a vinyl ether bond, $R_4$ is hydrogen, and $R_1$ is represented by formula II where $R_5$, $R_6$, and $R_7$ are each hydrogen (i.e., in the zwitterion form, e.g., where the pH ranges from about 2 to about 7), and n is equal to 2; and 3. n-methylethanolamine and N,N-dimethylethanolamine derivatives.

Many of the phospholipids described herein are naturally occurring, and are present, for example, in cellular membranes and cellular extracts. For example, phosphatidylcholine frequently forms about half of the membrane phospholipids in animal preparations. Phosphatidylethanolamine is the principal phospholipid present in bacteria.

Phospholipids are present in crude vegetable oils, such as soybean oil. Various refining procedures known in the art may be used to concentrate the phospholipids as various factions, and these factions will generally be provided as a mixture of phospholipids. For example, crude commercial lecithin from soybean oil is not pure "lecithin" but may contain for example a total of from 50 to 70 wt. % of a mixture of phosphates—in addition to phosphatidylcholine also comprising phosphatidylethanolamine, phosphatidyl serine, phosphatidyl inositol, and other phospholipids. Other sources of lecithin include egg yolk, milk, and animal brains.

The intercalating agents described herein having reduced (e.g., none, or one or more) unsaturated bonds may be provided after hydrogenation or partial hydrogenation. For example, lecithin may be provided as hydrogenated lecithin.

The average interlayer spacing between the silicate layers of the intercalated layered silicate may be at least about any of the following: 20, 30, 40, 50, 60, 70, 80, and 90 Å; and/or may be at most about any of the following: 100, 90, 80, 70, 60, 50, 40, 30, 25 Å. The amount of the at least one intercalating agent sorbed between the silicate layers may be effective to provide any of the forgoing average interlayer spacing between the silicate layers. The measurement of the average interlayer spacing of the intercalated layered silicate may be made at a relative humidity of 60%.

The amount of the at least one intercalating agent sorbed in the intercalated layered silicate per 100 weight parts layered silicate may be at least about and/or at most about any of the following: 5, 10, 20, 30, 50, 70, 90, 110, 150, 200, and 300 weight parts.

Blends of Intercalating Agent

The amount of the at least one intercalating agent sorbed in the intercalated layered silicate (i.e., any of the amounts described above) may comprise any of only one, at least one, only two, at least two, at most two, only three, at most three, and at least three of any of the intercalating agents described above.

The intercalated layered silicate may comprise a first intercalating agent (selected from those described above) sorbed in the intercalated layered silicate per 100 weight parts layered silicate of at least about and/or at most about any of the following: 5, 10, 20, 30, 50, 70, 90, 110, 150, 200, and 300 weight parts. The intercalated layered silicate may comprise a second intercalating agent (selected from those described above and different from the first intercalating agent) sorbed in the intercalated layered silicate per 100 weight parts layered silicate of at least about and/or at most about any of the following: 0, 5, 10, 20, 30, 50, 70, 90, 110, 150, 200, and 300 weight parts. The intercalated layered silicate may comprise a third intercalating agent (selected from those described above and different from the first and second intercalating agents) sorbed in the intercalated layered silicate per 100 weight parts layered silicate of at least about and/or at most about any of the following: 0, 5, 10, 20, 30, 50, 70, 90, 110, 150, 200, and 300 weight parts.

The weight ratio of the first intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The weight ratio of the second intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The weight ratio of the third intercalating agent to the total amount of intercalating agents (selected from those described above) in the intercalated layered silicate may be at least about, and/or at most about, any of the following: 1:20, 1:15, 1:10, 1:5, 1:3, 1:2, 1:1, 2:1, 3:1, 5:1, 10:1, 15:1, and 20:1.

The ratio of the first to second intercalating agents may be at least about, and/or at most about, any of the following weight ratios based on the weight of the intercalating agents: 1:20, 1:15, 1:10, 1:5, 1:3, 1:2, 1:1, 2:1, 3:1, 5:1, 10:1, 15:1, and 20:1. The ratio of the first to third intercalating agents may be at least about, and/or at most about, any of the following weight ratios based on the weight of the intercalating agents: 1:20, 1:15, 1:10, 1:5, 1:3, 1:2, 1:1, 2:1, 3:1, 5:1, 10:1, 15:1, and 20:1.

Manufacture of the Intercalated Layered Silicate

To make the intercalated layered silicate, a layered silicate is mixed with the intercalating agent to effect the inclusion (i.e., sorption) of the intercalating agent in the interlayer space between the silicate layers of the layered silicate. In doing so, the resulting intercalated layered silicate may be rendered organophilic (i.e., hydrophobic) and show an enhanced attraction to an organic matrix medium.

In making the intercalated layered silicate, the intercalating agent may first be mixed with a carrier, for example, a carrier comprising one or more solvents such as water and/or organic solvents such as ethanol to disperse or solubilize the intercalating agent in the carrier. The intercalating agent/carrier blend may subsequently be mixed with the layered silicate. Alternatively, the layered silicate may be mixed with the carrier to form a slurry, to which the intercalating agent may be added. Also, the intercalating agent may be mixed directly with the layered silicate without the benefit of a carrier. Intercalation may be enhanced by addition of one or more of heat, pressure, high shear mixing, ultrasonic cavitation, and microwave radiation to any of the above systems.

The inclusion of the intercalating agent within the interlayer spaces between the silicate layers of the layered silicate increases the interlayer spacing between adjacent silicate layers. This may disrupt the tactoid structure of the layered silicate to enhance the dispersibility of the intercalated layered silicate in the matrix medium, as discussed below.

The intercalating agent sorbed between the silicate layers may be an amount and/or type effective to increase the interlayer spacing between the silicate layers—relative to the spacing before the sorption of the intercalating agent—by at least about any of the following: 5, 6, 7, 8, 10, 12, 14, 15, 18, 20, 30, 40, 50, 60, 70, 80, and 90 Å; and/or by at most about any of the following: 100, 90, 80, 70, 60, 50, 40, 30, 25, 20, 18, 15, 12, 10, 8, and 7 Å.

The intercalating agent sorbed between the silicate layers may be an amount and/or type effective to increase the interlayer spacing between the silicate layers—relative to the spacing before the sorption of the intercalating agent—by at least about any of the following: 5, 6, 7, 8, 10, 12, 14, 15, 18, 20, 30, 40, 50, 60, 70, 80, and 90 Å; and/or by at most about any of the following: 100, 90, 80, 70, 60, 50, 40, 30, 25, 20, 18, 15, 12, 10, 8, and 7 Å.

The intercalated layered silicate may be further treated (or the layered silicate may be treated before intercalation to form the intercalated layered silicate) to aid dispersion and/or exfoliation in a matrix medium and/or improve the strength of a resulting polymer/silicate interface. For example, the intercalated layered silicate (or the layered silicate before intercalation to form the intercalated layered silicate) may be treated with a surfactant or reactive species to enhance compatibility with the matrix medium. With many layered silicates, the silicate layers terminate with surface silanol functionality. It may be desirable for greater compatibility with non-polar matrices to render these surfaces more hydrophobic. One method to achieve this is to modify the surface (e.g., react the functional groups present on the edges of the silicate layers) with an organosilane reagent (e.g., silane coupling agent) such as, n-octadecyldimethylchlorosilane, n-octadecyldimethylmethoxysilane, trimethylchlorosilane, hexamethyldisilazane, and the like.

Also by way of example, the intercalated layered silicate may be further intercalated with a compatibilizer, such as a wax, polyolefin oligomer, or polymer having polar groups. Exemplary compatibilizer waxes include polyethylene wax, oxidized polyethylene wax, polyethylene vinyl acetate wax, polyethylene acrylic acid wax, polypropylene wax, montan wax, carnauba wax, candelilla wax, beeswax, and maleated waxes. Examples of maleated wax include maleic anhydride modified olefin oligomer or polymer, and maleic anhydride modified ethylene vinyl acetate oligomer or polymer. An oligomer or polymer may be modified (e.g., grafted) with unsaturated carboxylic acid anhydride (i.e., anhydride-modified oligomer) to incorporate anhydride functionality, which promotes or enhances the adhesion characteristics of the oligomer or polymer (i.e., promotes or enhances the compatibility of the modified oligomer or polymer with the intercalated layered silicate. Examples of unsaturated carboxylic acid anhydrides include maleic anhydride, fumaric anhydride, and unsaturated fused ring carboxylic acid anhydrides. Anhydride-modified polymer may be made by grafting or copolymerization, as is known in the art. Useful anhydride-modified oligomers or polymers may contain anhydride group in an amount (based on the weight of the modified polymer) of at least about any of the following: 0.1%, 0.5%, 1%, and 2%; and/or at most about any of the following: 10%, 7.5%, 5%, and 4%.

Alternatively, the intercalated layered silicate may be substantially free of organosilane reagent (e.g., silane coupling agent), or substantially free of compatibilizers, such as one or more of any of those discussed above.

Dispersed-Particle Composition

The intercalated layered silicate may be exfoliated to form a dispersed-particle composition comprising a plurality of dispersed particles comprising exfoliated silicate platelets dispersed within a matrix medium. The dispersed particles may comprise silicate platelets having intercalating agent of the type discussed herein sorbed to the silicate platelets. The term "sorbed to" in this context means held to the surface not by covalent bonding but by one or more of ionic complexing, electrostatic complexing, chelation, hydrogen bonding, ion-dipole interaction, dipole-dipole interaction; and van der Waals forces.

The matrix medium may comprise one or more polymers, for example, one or more thermoplastic polymers, such as one or more polymers selected from one or more polyolefin, ethylene/vinyl alcohol copolymer, ionomer, vinyl plastic, polyamide, polyester, and polystyrene, for example, one or more of any of the polymers described below. The matrix medium may comprise any one class of polymer described herein, or any one of the polymers described herein, in at least about and/or at most about, any of the following amounts: 10, 20, 30, 40, 50, 60, 70, 80, 90, 95, and 99%, based on the weight of the matrix medium.

The matrix medium may comprise one or more energy curable polymer precursors, for example, one or more energy curable precursors selected from multifunctional acrylates or methacrylates, thiol-ene systems, epoxy/amine or epoxy polyol systems, and polyurethane precursors such as isocyanates and polyols.

The matrix medium may comprise one or more compounds useful in the formulation of paints, coatings, varnishes, greases, or pharmaceutical excipients (either topical or internal).

Polyolefins

The matrix medium may comprise one or more polyolefins, such as one or more of any of the polyolefins described herein. Exemplary polyolefins include ethylene homo- and co-polymers and propylene homo- and co-polymers. The term "polyolefins" includes copolymers that contain at least 50 mole % monomer units derived from olefin. Ethylene homopolymers include high-density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene; 1-hexene, 1-octene, and mixtures thereof.

Exemplary EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another exemplary ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl(meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes: 1) propylene/ethylene copolymers ("EPC"), which are copolymers of propylene and ethylene having a majority weight % content of propylene, such as those having an ethylene comonomer content of less than 15%, less than 6%, and at least about 2% by weight and 2) propylene/butene copolymers having a majority weight % content of propylene.

EVOH

The matrix medium may comprise ethylene/vinyl alcohol copolymer ("EVOH"), such as one or more of any of the EVOH described herein. EVOH may have an ethylene content of about 32 mole %, or at least about any of the following values: 20 mole %, 25 mole %, and 30 mole %. EVOH may have an ethylene content of below about any of the following values: 50 mole %, 40 mole %, and 33 mole %. As is know in the art, EVOH may be derived by saponifying or hydrolyzing ethylene/vinyl acetate copolymers, for example, to a degree of hydrolysis of at least about any of the following values: 50%, 85%, and 98%.

Ionomer

The matrix medium may comprise ionomer, such as one or more of any of the ionomers described herein. Ionomer is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinyl Plastics

The matrix medium may comprise vinyl plastics, such as one or more of the vinyl plastics described herein. Vinyl plastics include polyvinyl chloride ("PVC"), vinylidene chloride polymer ("PVdC"), and polyvinyl alcohol ("PVOH"). Polyvinyl chloride ("PVC") refers to a vinyl chloride-containing polymer or copolymer—that is, a polymer that includes at least 50 weight percent monomer units derived from vinyl chloride ($CH_2$=CHCl) and also, optionally, one or more comonomer units, for example, derived from vinyl acetate. One or more plasticizers may be compounded with PVC to soften the resin and/or enhance flexibility and processability. Useful plasticizers for this purpose are known in the art.

Another exemplary vinyl plastic is vinylidene chloride polymer ("PVdC"), which refers to a vinylidene chloride-containing polymer or copolymer—that is, a polymer that includes monomer units derived from vinylidene chloride ($CH_2$=$CCl_2$) and also, optionally, monomer units derived from one or more of vinyl chloride, styrene, vinyl acetate, acrylonitrile, and $C_1$-$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer ("VDC/MA"), vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

A layer that includes PVdC may also include a thermal stabilizer (e.g., a hydrogen chloride scavenger such as epoxidized soybean oil) and a lubricating processing aid (e.g., one or more polyacrylates).

Polyamide

The matrix medium may comprise polyamide, such as one or more of the polyamides described herein. Polyamides include those of the type that may be formed by the polycondensation of one or more diamines with one or more diacids and/or of the type that may be formed by the polycondensation of one or more amino acids and/or of the type formed by the ring opening of cyclic lactams. Useful polyamides include aliphatic polyamides and aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

$$HOOC—Z—COOH$$

where Z is representative of a divalent aliphatic or cyclic radical containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), polyhexamethylene terephthalamide ("nylon-6,T"), poly(2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12" or "poly(lauryllactam)").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethyleneazelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

Polyesters

The matrix medium may comprise polyester, such as one or more of the polyesters described herein. Polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid component of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Polystyrene

The matrix medium may comprise polystyrene, such as one or more of the polystyrenes described herein. Polysytrene includes stryene homo- and co-polymers. Polystyrene may be substantially atactic, syndiotactic or isotactic. The term "polysytrene" includes copolymer that contains at least 50 mole % monomer units derived from styrene. Styrene may be copolymerized with alkyl acrylates, maleic anhydride, isoprene, or butadiene. Styrene copolymers with isoprene and butadiene may be further hydrogenated.

Energy Curable Polymer Precursors

The matrix medium may comprise one or more energy curable polymer precursors, such as those described herein. An energy curable polymer precursor is a compound (e.g., monomer or oligomer) that is intended for transformation to a cured polymer by the application of energy in the form of heat and/or radiation (e.g., light), and may also involve an initiator and/or catalyst. The resulting energy cured polymer may be a thermoset polymer or a thermoplastic polymer. A single energy curable polymer precursor may react to form a polymer, or two or more energy curable polymer precursors may react together to form a polymer. The energy curable polymer precursor may be multifunctional, that is, adapted to form crosslinked polymer when cured. The energy curable chemical reaction may be induced by heat, catalyst interaction, radiation (e.g., light), or mixing of the energy curable polymer precursors, or by a combination of two or more of any of the foregoing mechanisms (e.g., dual cure mechanisms).

Useful energy curable polymer precursors may include one or more of the energy curable polymer precursors that are precursors to one or more of the following polymers: polyester resins (e.g., alkyd resin), allyl resins (e.g., diallyl phthalate, diallyl isophtahalate, diallyl maleate, and diallyl chlorendate), amino resins (e.g., urea resins, melamine resins, and their copolymers with formaldehyde), epoxy resins, furan resins, phenolic resins (e.g., phenol-aralkyl resins, phenol-formaldehyde resins), polyacrylic ester resins, polyamide resins, polyurethane resins, polyacrylamide resins, polyimide resins, and acrylamide resins.

Exemplary energy curable polymer precursors may include (meth)acrylates (i.e., methacrylates and/or acrylates), multifunctional (meth)acrylates, thiol-ene systems, and maleimides.

Exemplary energy curable polymer precursors, for example, with respect to polyurethane polymer precursors, may include polyols and polyisocyanates (e.g., toluene diisocyanate and diphenyl-methanediisocyanate).

With respect to the polyurethane and epoxy resin precursors, for example, the intercalated layered silicate may be mixed with the polyol precursor component rather than the more reactive component to help minimize premature reaction.

Additional Matrix Medium

The matrix medium may comprise one or more compounds useful in the formulation of one or more of any of the following: coatings (i.e., paints and/or varnishes), inks, greases, and pharmaceutical dosage forms.

The matrix medium may comprise one or more materials selected from coating (i.e., paint and/or varnish) solvents, coating binders, and coating resins. Useful coating solvents, coating binders, and coating resins are known to those of skill in the art; see, for example, those discussed in Paints and Coatings, Ullmann's Encyclopedia of Industrial Chemistry, Volume 24, pages 591-790 (2003 Wiley-VCH), of which pages 591-790 are incorporated herein by reference. Examples include mineral spirits, toluene, and linseed oil.

The matrix medium may comprise one or more materials selected from ink solvents and ink resins (e.g., ink binders and/or ink vehicles). Useful ink solvents and ink resins are known to those of skill in the art; see, for example, those discussed in Leach and Pierce, The Printing Ink Manual ($5^{th}$ edition 1993), which is incorporated herein in its entirety.

The matrix medium may comprise one or more materials selected from grease lubricating oils and grease gelling agents. Useful grease lubricating oils and grease gelling agents are known to those of skill in the art; see, for example, those discussed in Kirk-Othmer Encyclopedia of Chemical Technology, Volume 15, pages 493-98 ($4^{th}$ edition 1995), of which pages 493-98 are incorporated herein by reference.

Compounds useful in the formulation of pharmaceutical dosage forms include pharmaceutical (e.g., medical) excipients (e.g., carriers). The matrix medium may comprise one or more pharmaceutical excipients, for example, one or more excipients adapted for an internal pharmaceutical dosage form and/or adapted for an external pharmaceutical dosage form. Useful pharmaceutical excipients are known to those of skill in the art; see, for example, those discussed in Pharmaceutical Dosage Forms, Ullmann's Encyclopedia of Industrial Chemistry, Volume 25, pages 515-547 (2003 Wiley-VCH), of which pages 515-547 are incorporated herein by reference.

Dispersed Particles

The dispersed particles in the dispersed-particle composition may have an average size of less than about 100 nm in at least one dimension. The particles may have an average aspect ratio (i.e., the ratio of the average largest dimension to the average smallest dimension of the particles) of from about 10 to about 30,000. Typically, the aspect ratio for particles comprising silicate platelets exfoliated from an intercalated layered silicate may be taken as the length (largest dimension) to the thickness (smallest dimension) of the platelets. For a particle having a fiber configuration, the aspect ratio may be taken as the length (largest dimension) to the diameter (smallest dimension) of the particle.

Useful aspect ratios for the dispersed particles include at least about any of the following values: 10; 20; 25; 200; 250; 1,000; 2,000; 3,000; and 5,000; and at most about any of the following values: 25,000; 20,000; 15,000; 10,000; 5,000; 3,000; 2,000; 1,000; 250; 200; 25; and 20.

The dispersed particles may have an average size in the shortest dimension of at least about any of the following values: 0.5 nm, 0.8 nm, 2, nm, 3 nm, 4 nm, and 5 nm; and at most about any of the following values: 100 nm, 60 nm, 30 nm, 20 nm, 10 nm, 8 nm, 5 nm, and 3 nm, as estimated from transmission electron microscope ("TEM") images. The particles may have an average dimension small enough to maintain optical transparency of the matrix medium in which the particles are dispersed.

The amount of exfoliated particles dispersed in the dispersed-particle composition may be at least about any of the following values 0.1, 0.5, 1, 1.5, 2, 2.5, 3, 4, 5, and 10 weight %; and/or may be at most about any of the following values: 50, 40, 30, 20, 15, 10, 8, 6, 5, 4, 3, 2, and 1 weight %, based on the weight of the dispersed-particle composition. Also, the amount of exfoliated particles dispersed in the dispersed-particle composition may be at least about any of the following values: 0.1, 0.5, 1, 1.5, 2, 2.5, 3, 4, 5, and 10 weight parts; and/or may be at most about any of the following values: 100, 80, 60, 50, 40, 30, 20, 15, 10, 8, 6, 5, 4, 3, 2, and 1 weight parts, based on 100 weight parts of matrix medium, for example, based on 100 weight parts of the one or more polymers discussed above.

The dispersed-particle composition may comprise at least about any of the following: 50, 60, 70, 80, 90, 95, and 98 weight %; and at most about any of the following: 99, 98, 95, 90, 80, 70, and 60 weight %, based on the weight of the dispersed-particle composition of any of the following: 1) the matrix medium, or 2) the one or more polymers, or 3) the energy curable polymer precursors, or 4) the coating solvents, coating binders, or coating resins, or 5) the ink solvents or ink resins, or 6) the grease lubricating oils or grease gelling agents, or 7) the cosmetic lipids, cosmetic emollients, cosmetic humectants, cosmetic film formers, cosmetic binders, cosmetic surfactants, or cosmetic solvents, or 8) pharmaceutical excipients.

The particles may comprise silicate platelets derived from the intercalated layered silicate and an intercalating agent sorbed to the silicate platelets, where the intercalating agent comprises one or more of the intercalating agents discussed herein.

The amount of intercalating agent sorbed to the silicate platelets may be at least about and/or at most about any of the following: 1, 5, 10, 20, 30, 50, 70, 90, 110, 150, 200, and 300 weight parts per 100 weight parts silicate platelets.

It is believed that exfoliated particles result when individual silicate layers of a layered silicate are no longer close enough to interact significantly with the adjacent layers via ionic, electrostatic or van der Waals attractions or to form strongly correlated systems due to the large aspect ratios of the platelets. An exfoliated layered silicate has lost its registry and may be relatively uniformly and randomly dispersed in a continuous matrix medium. It is believed that the dispersion in a matrix medium occurs when the interlayer spacing of the layered silicate is at or greater than the average radius of gyration of the molecules comprising the matrix medium.

A dispersing aid may be used to enhance exfoliation of the intercalated layered silicate into the matrix medium. Exemplary dispersing aids may include one or more of water, alcohols, ketones, aldehydes, chlorinated solvents, hydrocarbon solvents, and aromatic solvents.

Manufacture of the Dispersed-Particle Composition

The intercalated layered silicate may be exfoliated (e.g., partially or completely) in a matrix medium to form the dispersed-particle composition. The intercalated layered silicate may be added to the matrix medium under conditions effective to exfoliate at least a portion of the intercalated layered silicate into particles comprising silicate platelets dispersed in the matrix medium. An amount of intercalated layered silicate mixed with the matrix medium may be at least about any of the following: 0.1, 0.5, 1, 1.5, 2, 2.5, 3, 4, 5, and 10 weight parts intercalated layered silicate; and/or may be at most about any of the following values: 100, 80, 60, 50, 40, 30, 20, 15, 10, 8, 6, 5, 4, 3, 2, and 1 weight parts intercalated layered silicate, based on 100 weight parts of matrix medium, for example, based on 100 weight parts of the one or more polymers discussed above.

At least about any of the following amounts of the intercalated layered silicate added to the matrix medium may be dispersed as exfoliated particles having an average size of less than about 100 nm in at least one dimension: 50, 60, 70, 80, 90, 95, 98, and 99 weight parts exfoliated particles per 100 weight parts added intercalated layered silicate. The exfoliated silicate platelets may have the average thickness of the individual layers of the layered silicate, or may have as an average thickness multiples of less than about any of 10, 5, and 3 layers of the layered silicate. TEM images may be used to estimate the amount and size and characteristics of the exfoliated particles.

The effective exfoliation conditions may include the addition of mixing and/or shearing-energy to the mixture of the intercalated layered silicate and the matrix medium. The process variables for exfoliating the intercalated layered silicate in the matrix medium include time, temperature, geometry of the mixing apparatus, and the shear rate, and generally requires a balance of these variables, as is known to those of skill in the art. The balancing of these variables may take into account the desire to minimize the physical degradation or decomposition of the matrix medium and/or the intercalating agent, for example, by limiting the upper temperature of the processing and/or the amount of time at a selected temperature during processing.

An increase in temperature generally provides more thermal energy to enhance exfoliation. A decrease in temperature may lower the viscosity of the mixture while increasing the shear rate. An increase in shear rate generally enhances exfoliation. Shear rates of at least about any of the following may be applied to the mixture of the intercalated layered silicate and the matrix medium: $1\ \text{sec}^{-1}$, $10\ \text{sec}^{-1}$, $50\ \text{sec}^{-1}$, $100\ \text{sec}^{-1}$, and $300\ \text{sec}^{-1}$.

Illustrative methods or systems for applying shear to effect exfoliation of the intercalated layered silicate in the matrix medium include mechanical systems, thermal shock, pressure alternation, and ultrasonics. A flowable mixture may be sheared by mechanical methods, such as the use of stirrers, blenders, Banbury type mixers, Brabender type mixers, long continuous mixers, injection molding machines, and extruders. Twin screw extruders may be useful, for example, for mixing the intercalated layered silicate with a thermoplastic matrix medium. A thermal shock method achieves shearing by alternatively raising and lowering the temperature of the mixture to cause thermal expansions and contractions to induce internal stresses that cause shear. Sudden and alternating pressure changes may also be used to apply shear to the mixture. Ultrasonic methods induce shear by cavitation or resonant vibrations, which cause varying portions of the mixture to vibrate and become excited at different phases.

The effective exfoliation conditions may comprise raising the temperature of the matrix medium, for example a matrix medium comprising one or more thermoplastic polymers, so that the matrix medium is thermally processable at a reasonable rate in the mechanical system either before, while, or after adding the intercalated layered silicate to the matrix medium. During processing, the mixture of the intercalated layered silicate and the matrix medium may be at a temperature, for example, of at least about and/or at most about any of the following temperatures: 100° C., 150° C., 200° C., 240° C., 280° C., 300° C., 320° C., 350° C., 380° C., and 400° C. The amount of residence time that the mixture of the intercalated layered silicate and the matrix medium may reside at any of these temperatures may be at least about and/or at most about any of the following times: 2, 4, 5, 8, 10, 12, 15, and 20 minutes.

Before effecting exfoliation, the layered silicate may be reduced in size by methods known in the art, including, but not limited to, grinding, pulverizing, hammer milling, jet milling, ball milling, sieving, and their combinations, so that the average particle diameter of the layered silicate may be, for example, less than about any of 100, 50, and 20 microns.

Use of the Intercalated Layered Silicate and Dispersed-Particle Composition

The dispersed particles may be used to enhance the physical and/or performance properties of the matrix medium in which they are dispersed. For example, the dispersed particles may improve one or more of the modulus, strength, impact toughness, permeability, rheological, and surface adhesion properties of the matrix medium incorporating the particles relative to the matrix medium without the particles.

Several types of products may benefit from incorporation of the dispersed-particle composition to improve, for example, performance properties. Exemplary products that may comprise the dispersed-particle composition include:

sheets and panels, which, for example, may be further shaped by pressing, molding, and/or thermoforming to form useful objects;

coatings (i.e., paints and/or varnishes);

lubricants, for example, food-grade lubricants;

greases;

pharmaceuticals, such as topical medicinal compositions (e.g., anti-fungal compositions, anti-bacterial compositions, anesthetics, anti-inflammatory compositions, pain-relief ointments, and rash/itch/irritation ointments) and internal medicinal compositions (e.g., pills, tablets, capsules, powders, and solutions);

dental articles, such as fillings, crowns, inlays, veneer, prosthesis, sealants, implants, dentures, bridges, bonding agents, and impression patterns; and packaging materials, such as packaging films (e.g., shrink films, stretch films, and food packaging films), bottles, trays, and containers.

A packaging film may comprise one or more layers comprising any of the dispersed-particle compositions described herein. The film may have any total thickness as long as it provides the desired properties (e.g., free shrink, shrink tension, flexibility, Young's modulus, optics, strength, barrier) for the given application of expected use. The film may have a thickness of less than about any of the following: 20 mils, 10 mils, 5 mils, 4 mils, 3 mils, 2 mils, 1.5 mils, 1.2 mils, and 1 mil. The film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, 1.5 mils, 2 mils, 3 mils, and 5 mils.

The film may be monolayer or multilayer. The film may comprise at least any of the following number of layers: 1, 2, 3, 4, 5, 6, 7, 8, and 9. The film may comprise at most any of the following number of layers: 20, 15, 10, 9, 7, 5, 3, 2, and 1. The term "layer" refers to a discrete film component which is coextensive with the film and has a substantially uniform composition. Any of the layers of the film may have a thickness of at least about any of the following: 0.05, 0.1, 0.2, 0.5, 1, 2, and 3 mil. Any of the layers of the film may have a thickness of at most about any of the following: 20, 10, 5, 2, 1, and 0.5 mils. Any of the layers of the film may have a thickness as a percentage of the total thickness of the film of at least about any of the following values: 1, 3, 5, 7, 10, 15, 20, 30, 40, 50, 60, 70, 80, and 90%. Any of the layers of the film may have a thickness as a percentage of the total thickness of the film of at most about any of the following values: 90, 80, 50, 40, 35, 30, 25, 20, 15, 10, and 5%.

A layer of the film may comprise at least about and/or at most about any of the following amounts of dispersed-particle composition based on the layer weight: 0.1, 0.5, 1, 3, 5, 10, 20, 50, 60, 70, 80, 90, 95, 99, and 100 weight %. A layer of the film comprising any of the foregoing amounts of dispersed-particle composition may also have a thickness of at least about, and/or at most about, any of the following percentages based on the total thickness of the film: 90, 80, 70, 60, 50, 40, 30, 20, 15, 10, and 5%.

A layer comprising the dispersed-particle composition may be an outer layer of the film. An outer layer may be an "outside layer" of the film (i.e., an outer layer adapted or designed to face to the outside of a package incorporating the film) or an "inside layer" of the film (i.e., an outer layer adapted or designed to face the inside of a package incorporating the film). If the film comprises only one layer, then the one layer may be considered an "outer layer." A layer comprising the dispersed-particle composition may be an inner or interior layer of the film. An inner or interior layer of the film is between two outer layers of the film.

For example, an internal tie layer of a film, such as disclosed in U.S. patent application Ser. No. 10/452,892 filed Jun. 2, 2003 by Grah et al, which is incorporated herein in its entirety by reference, may comprise the dispersed-particle composition discussed above.

The film comprising the dispersed-particle composition may be formed into a package (e.g., bag or casing) for packaging (e.g., enclosing) an object such as a food product (e.g., coffee, nuts, snack foods, cheese, ground or processed meat products, fresh red meat products, and more specifically, meats such as poultry, pork, beef, sausage, lamb, goat, horse, and fish).

The package may be formed by sealing the film to itself, or by sealing the film to a support member (e.g., a tray, cup, or tub), which supports the product (e.g., a food product) that may be disposed on or in the support member. Seals may be made by adhesive or heat sealing, such as bar, impulse, radio frequency ("RF") or dielectric sealing. Suitable package configurations include end-seal bag, side-seal bag, L-seal bag, pouch, and seamed casing (e.g., back-seamed tubes by forming an overlap or fin-type seal). Such configurations are known to those of skill in the art. The support member (e.g., tray) may also comprise any of the dispersed-particle compositions discussed above. The support member may also comprise a thermoformed web comprising a thermoplastic.

The package may also be formed by laminating or sealing the film comprising the dispersed-particle composition to another substrate. Suitable substrates may comprise: 1) a film comprising one or more of the following materials: polyester (e.g., PET), metalized polyester (e.g., metalized PET), PVdC-coated PET, polypropylene (e.g., biaxially oriented polypropylene or BOPP), metalized BOPP, PVdC, and coated BOPP, 2) paper, 3) paperboard, and 4) metal foil. A composite packaging structure may also be formed by extrusion coating of one or more polymer layers, any or all of which may comprise the dispersed-particle composition, to any of the above substrates.

Also by way of example, once a film comprising the dispersed-particle composition has been placed in a tube or casing configuration, one end of the tube may be closed by tying, clipping (e.g., metal clips), or sealing. The tube may then be filled through the remaining open end with an uncooked food product (e.g., a sausage emulsion or another flowable meat product). The remaining open end may then be closed by tying, clipping, or sealing to form a package enclosing a food product. This filling procedure may take place, for example, by vertical form-fill-seal or horizontal form-fill-seal processes known to those of skill in the art.

The packaged food product enclosed within the package comprising the film comprising the dispersed-particle composition may be processed (e.g., cooked, retorted, or pasteurized) for example, by immersing the packaged food in a liquid hot water bath, exposing the packaged food to steam, or exposing the packaged food to hot air, for an effective amount of time and at an effective temperature and pressure. This exposure may also shrink the package tightly about the enclosed food product by heat shrinking the film. The packaged food may also be exposed to an amount of radiation such as microwave radiation effective to cook the packaged food. After the food product has been processed (e.g., cooked or retorted) to a desired level, the packaged food may be sold in the packaged form, or the package may be stripped from the cooked food so the food may be processed further or consumed.

A film comprising the dispersed-particle composition may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by extrusion coating. Alternatively, the film may be prepared by adhesively or extrusion laminating the various layers. These processes are known to those of skill in the art. A combination of these processes may also be employed.

A film comprising the dispersed-particle composition may be non-oriented. Alternatively, a film comprising the dispersed-particle composition may be oriented in either the machine (i.e., longitudinal), the transverse direction, or in both directions (i.e., biaxially oriented), in order to reduce the permeability and/or to enhance the strength, optics, and durability of the film. The orientation of the film may also enhance the orientation of the silicate platelets of the dispersed-particle composition, so that generally the major plane through the platelets is substantially parallel to the major plane through the film. The film may be oriented in at least one direction by at least about any of the following ratios: 2.5:1, 3:1, 3.5:1, and 3.7:1; and/or by at most about 10:1.

A film comprising the dispersed-particle composition may be non-heat shrinkable—for example, having a free shrink in any direction at 185° F. (85° C.) of less than about any of the following: 4%, 3%, 1%, and 0.5%. A film comprising the dispersed-particle composition may be heat shrinkable (i.e., has a shrink characteristic), which as used herein, means that the film has a free shrink at 185° F. (85° C.) in at least one direction of at least about 5% at 185° F. For example, the film comprising the dispersed-particle composition may have a free shrink at 185° F. (85° C.) in either of the machine or transverse directions (or both directions) of at least about, and/or at most about, any of the following: 7%, 10%, 15%, 25%, 30%, 40%, 45%, 50%, 55%, 60%, 70%, and 80%. Further, the film may have any of the preceding free shrink values measured at a temperature selected from any of 200° F., 220° F., 240° F., 260° F., and 280° F.

The film may have unequal free shrink in both directions (i.e., differing free shrink in the machine and transverse directions). For example, the film may have a free shrink (185° F.) in the machine direction of at least 40% and a free shrink (185° F.) in the transverse direction of at least 25%. The film may not have a heat shrink characteristic in both directions. For example, the film may have a free shrink at 185° F. in one direction of less than about any of the following: 5%, 4%, 3%, 2% and 1%; or the film may have 0% free shrink at 185° F. in one direction. The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

As is known in the art, a heat-shrinkable film shrinks upon the application of heat while the film is in an unrestrained state. If the film is restrained from shrinking to some extent—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

A film comprising the dispersed-particle composition may exhibit a shrink tension at 185° F. in at least one direction of at least about, and/or at most about, any of the following: 100 psi, 150 psi, 175 psi, 200 psi, 225 psi, 250 psi, 275 psi, 300 psi, 325 psi, 350 psi, 400 psi, 450 psi, 500 psi, 550 psi, and 600 psi. Further, the film may have any of the preceding shrink tensions measured at a temperature selected from any of 200° F., 220° F., 240° F., 260° F., and 280° F. The film may have unequal shrink tension in both directions (i.e., differing shrink tension in the machine and transverse directions). The film may not have a shrink tension in one or both directions. Shrink tension is measured at a specified temperature (e.g., 185° F.) in accordance with ASTM D 2838 (Procedure A), which is incorporated herein in its entirety by reference. All references to shrink tension in this application are by this standard.

A film comprising the dispersed-particle composition may be annealed or heat-set to reduce the free shrink slightly, substantially, or completely; or the film may not be heat set or annealed once the oriented film has been quenched in order that the film will have a high level of heat shrinkability.

Appearance Characteristics

A film comprising the dispersed-particle composition may have low haze characteristics. Haze is a measurement of the transmitted light scattered more than 2.5° from the axis of the incident light. Haze is measured against the outside layer of the film. As previously discussed, the "outside layer" is the outer layer of the film that will be adjacent the area outside of the package comprising the film. Haze is measured according to the method of ASTM D 1003, which is incorporated herein in its entirety by reference. All references to "haze" values in this application are by this standard. The haze of the film may be no more than about any of the following values: 30%, 25%, 20%, 15%, 10%, 8%, 5%, and 3%.

A film comprising the dispersed-particle composition may have a gloss, as measured against the outside layer of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle), which is incorporated herein in its entirety by reference.

A film comprising the dispersed-particle composition may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film may be at least about any of the following values: 65%, 70%, 75%, 80%, 85%, and 90%, as measured in accordance with ASTM D1746. All references to "regular transmittance" values in this application are by this standard.

The total luminous transmittance (i.e., total transmittance) of a film comprising the dispersed-particle composition may be at least about any of the following values: 65%, 70%, 75%, 80%, 85%, and 90%, measured in accordance with ASTM D1003. All references to "total luminous transmittance" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

The following examples are presented for the purpose of further illustrating and explaining some embodiments of the present invention and are not to be taken as limiting in any regard. Unless otherwise indicated, all parts and percentages are by weight.

Example 1

250 grams of montmorillonite (Cloisite Na+, Southern Clay Products) was mixed with 100 grams of water in a Hobart mixing bowl at room temperature to form a clay/water slurry. 250 grams of refined soybean derived lecithin (Alfa Aesar) was heated to 40° C. and then added to the slurry. The resulting mixture was compounded using a Hobart auger extruder at room temperature for 30 minutes and with a rotor rotation speed of 200 rpm to form an intercalated layered silicate, namely, a soy lecithin intercalated montmorillonite clay. The intercalated clay was dried in an 80° C. oven overnight, ground, and sieved through a 200 mesh screen to yield a fine powder of the soy lecithin intercalated montmorillonite.

The average interlayer spacing (i.e., the basal d-spacing) of the resulting intercalated layered silicate (i.e., lecithin intercalated clay) was determined using a BEDE D1 X-ray diffractometer. A representative sample of the lecithin intercalated clay was set upon a fritted glass slide for scanning by the diffractometer, which was operated in the powder diffraction mode using a copper X-ray source (X-ray wave-length 0.154 nm) and a sweep of 0.5 to 20 2 Theta-Omega. The interlayer spacing was calculated using Bragg's Law, $n\lambda=2*d \sin \theta$, where "n"=the order of the diffraction peak, "λ"=the wavelength, "d"=the interlayer spacing (i.e., the basal d-spacing), and "θ"=the scattering angle. The diffraction pattern for the Example 1 lecithin intercalated clay is shown in FIG. 1. The pattern indicated a diffraction peak centered on a 2θ value of 1.43°, which calculates to an average interlayer spacing of the layered silicate (i.e., the primary basal d-spacing) of 61.7 Å.

Figure 2:
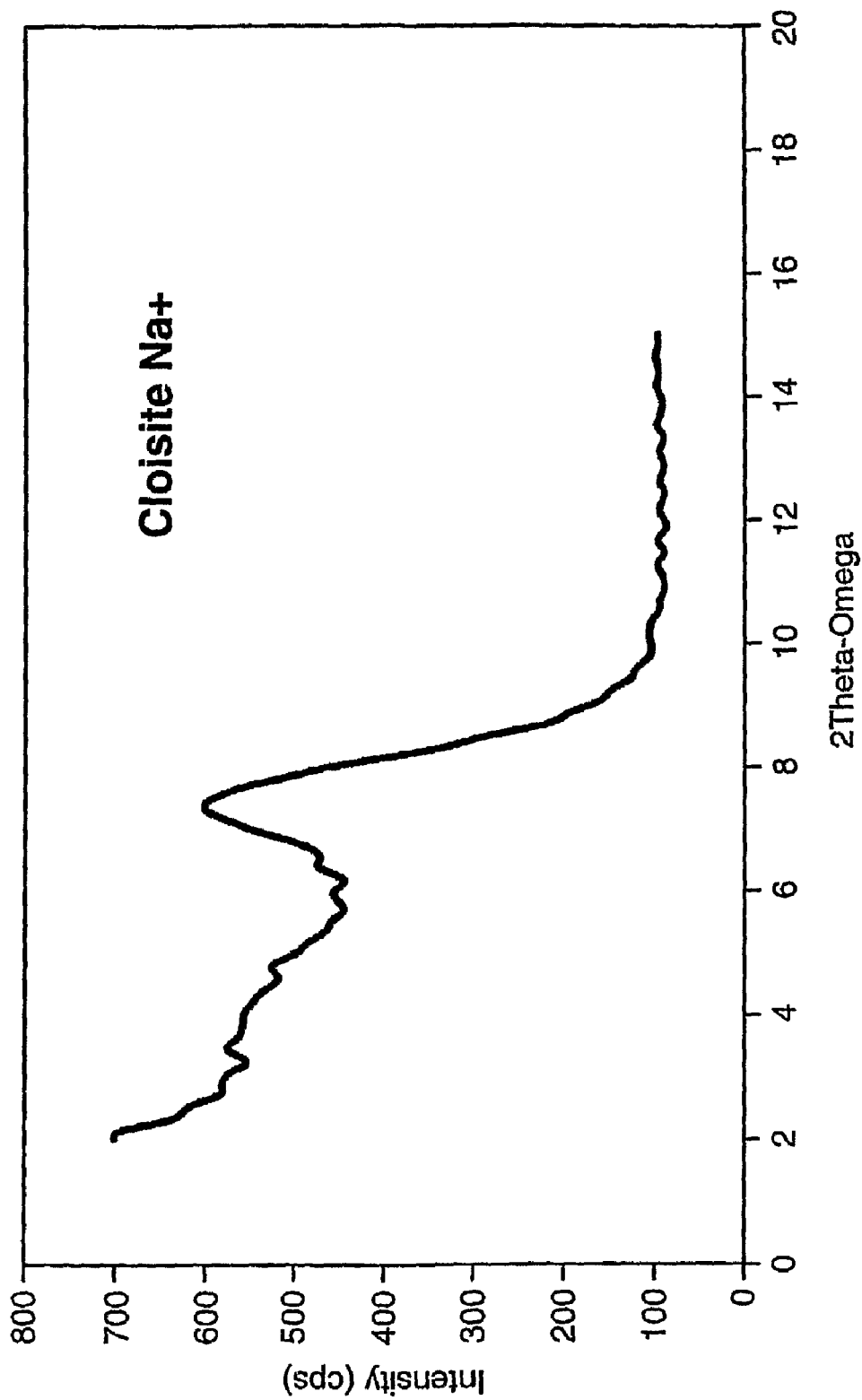
FIG. 2 is an X-ray diffraction pattern for non-intercalated montmorillonite clay.

FIG. 2 shows the diffraction pattern for the non-intercalated montmorillonite clay. The pattern indicated a diffraction peak at a 2θ of 7.42°, which calculates to an average interlayer spacing (i.e., the primary basal d-spacing) for the montmorillonite clay before intercalation of 11.9 Å, measured and calculated as set forth above. Accordingly, the Example 1 inclusion of soy lecithin intercalating agent between the silicate layers of the montmorillonite increased the average interlayer spacing of the silicate layers by about 49.8 Å.

Comparative Sample 1

Figure 3:
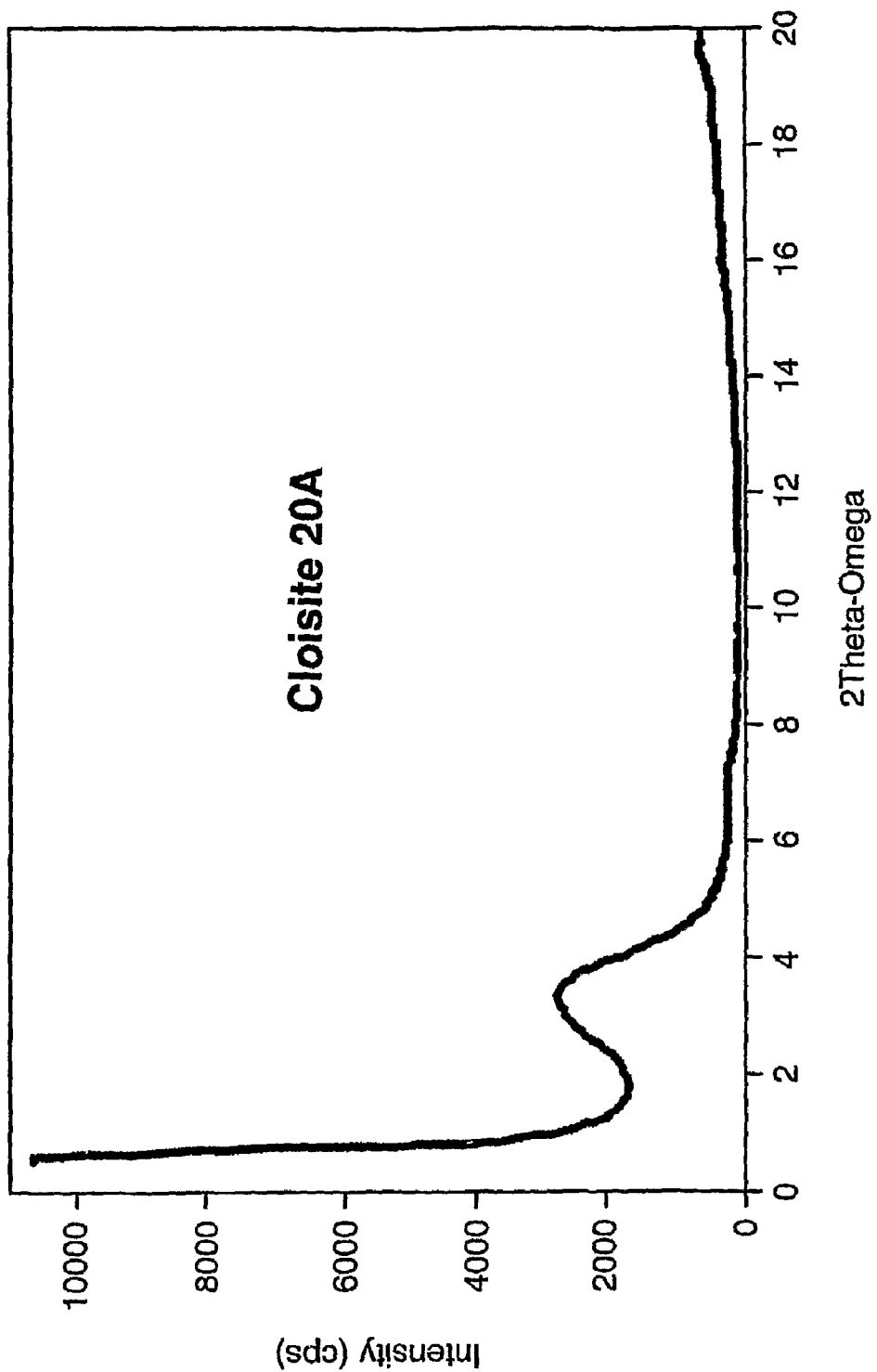
FIG. 3 is an X-ray diffraction pattern for montmorillonite clay intercalated with dimethyl didehydrogenated tallow quaternary ammonium, as discussed in Comparative Sample 1.

A commercially available dimethyl didehydrogenated tallow quaternary ammonium intercalated montmorillonite (Cloisite 20A) was obtained from Southern Clay Products. The concentration of the intercalating agent was 95 meq/100 g clay (i.e., approximately 30 weight % intercalant). The average interlayer spacing of the intercalated clay was determined as described above with respect to Example 1. The diffraction pattern for Cloisite 20A is shown in FIG. 3. The pattern indicated a diffraction peak at a 2θ of 3.65°, which calculated to an average interlayer spacing of the layered silicate of 24.2 Å.

As discussed above with respect to FIG. 2, the average primary basal d-spacing for non-intercalated montmorillonite clay was determined to be 11.9 Å. Accordingly, the inclusion of the dimethyl didehydrogenated tallow quaternary ammonium intercalating agent between the silicate layers of the montmorillonite increased the average interlayer spacing of the silicate layers by about 12.3 Å.

Example 2

250 grams of montmorillonite (Cloisite Na+, Southern Clay Products) was mixed with 100 grams of water in a Hobart mixing bowl at room temperature to form a clay/water slurry. 500 grams of refined soybean derived lecithin (Alfa Aesar) was heated to 40° C. and then added to the slurry. The resulting mixture was compounded using a Hobart auger extruder at room temperature for 30 minutes and with a rotor rotation speed of 200 rpm to form an intercalated layered silicate, namely, a soy lecithin intercalated montmorillonite clay. The intercalated clay was dried in an 80° C. oven overnight, ground, and sieved through a 200 mesh screen to yield a fine powder of the soy lecithin intercalated montmorillonite clay.

Figure 4:
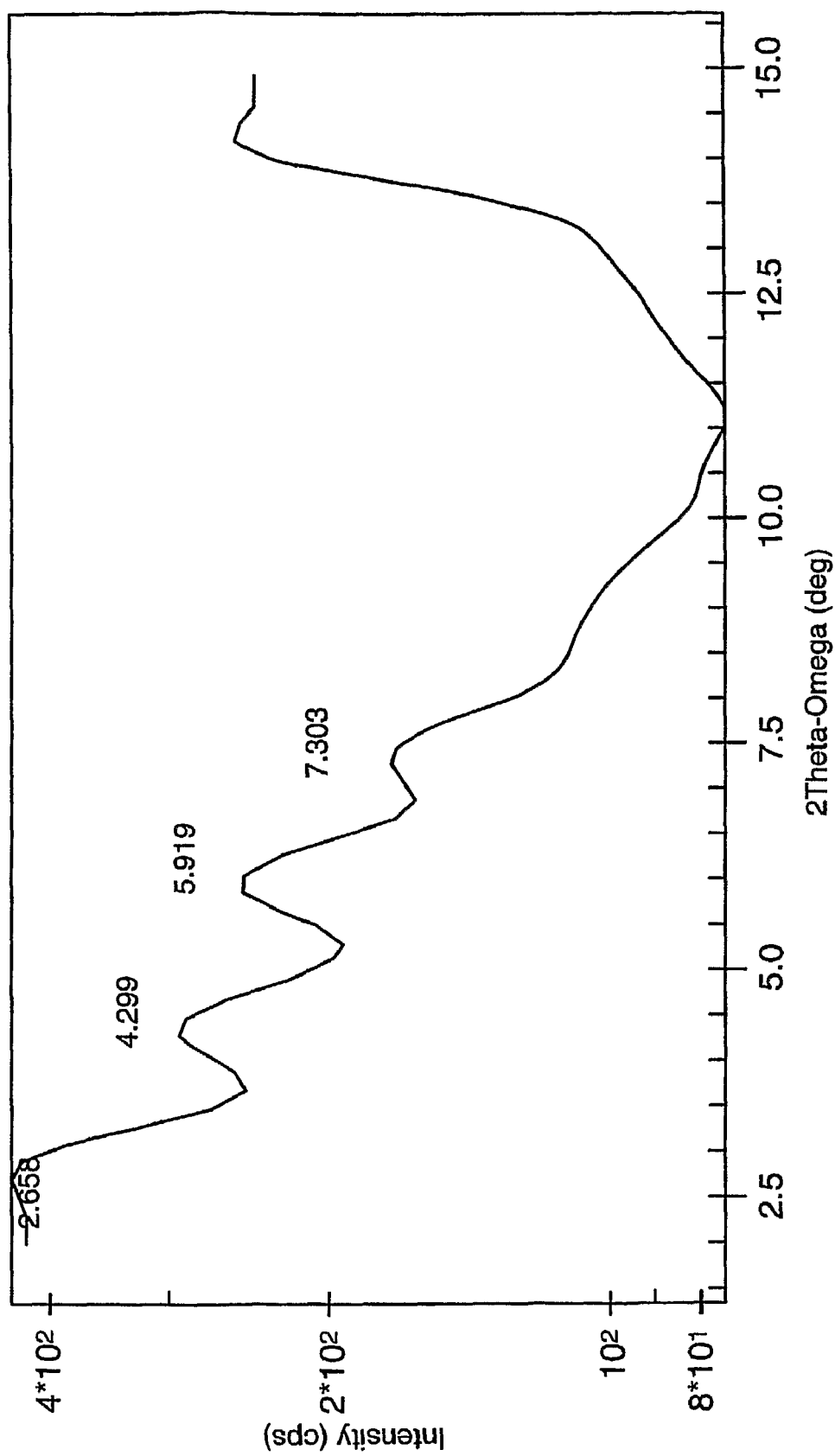
FIG. 4 is an X-ray diffraction pattern for montmorillonite clay intercalated with lecithin, as discussed in Example 2.

The average interlayer spacing (i.e., the basal d-spacing) of the resulting intercalated layered silicate (i.e., lecithin intercalated clay) was determined using the method described above with respect to Example 1. The diffraction pattern for the Example 2 lecithin intercalated clay is shown in FIG. 4. Although the pattern does not show the first order reflection, the pattern does indicate a series of higher order diffraction peaks centered on 2 theta-omega values of 2.66°, 4.30°, 5.92°, and 7.30°. These values of 2 Theta-Omega calculate to second, third, fourth, and fifth order d-spacings of the layered silicate of 29.4 Å, 20.5 Å, 147 Å, and 11.8 Å, respectively. These higher order peak indicate a primary (first order) silicate interlayer spacing of about 60 Å.

As discussed above with respect to FIG. 2, the average primary basal d-spacing for non-intercalated montmorillonite clay was determined to be 11.9 Å. Accordingly, the Example 2 inclusion of soy lecithin intercalating agent between the silicate layers of the montmorillonite increased the average interlayer spacing of the silicate layers by about 48.1 Å.

Example 3

The lecithin intercalated clay of Example 2 was mixed with a matrix medium of ethylene/methacrylic acid copolymer (EAA) having a 4 wt. % methacrylic acid comonomer content from the DuPont Corporation under the Nucrel 0403 trade name. The ratio of the mixture was 5 weight % lecithin intercalated clay to 95 weight % EAA copolymer medium. The mixture was compounded for 10 minutes at 150° C. using a Brabender 60 g bowl mixer operating at 60 rpm mixer speed to form the Example 3 dispersed-particle composition. The resulting Example 3 dispersed-particle composition was pressed on a Carver press between two metal plates at 140° C. into a transparent film having a thickness varying from 175 to 225 microns.

The thermo-mechanical properties of the Example 3 dispersed particle composition were evaluated by dynamic mechanical analysis using a RSA-11 Solids Analyzer. Samples of the Example 3 film were made having dimensions of 3 mm wide by 30 mm long. These samples were mounted and evaluated by the procedures outlined in ASTM D 4065-89 and ASTM 5026-90. The temperature was ramped at 3° C. increments with 30 seconds delay after each step to ensure thermal equilibrium. The annular frequency was 22 rad/sec. The strain was 0.2%. The matrix polymer EAA without intercalated layered silicate (Comparative Sample 2) was also similarly evaluated. The storage modulus (EÅ) determined at three different temperatures for the Example 3 and Comparative Sample 2 is shown in Table 1.

TABLE 2

| Temperature | Storage Modulus (MPa) | |
|---|---|---|
| (° C.) | Comparative Sample 2 | Example 3 |
| 21 | 260 | 310 |
| 51 | 64 | 77 |
| 81 | 27 | 33 |

Examples 4-7

Varying amounts of the lecithin intercalated clay of Example 2 was mixed with a matrix medium of ethylene/vinyl alcohol copolymer (EVOH) having 32 mole % vinyl alcohol content from the Eval Company of America under the Eval F101A trade name. The amounts of lecithin intercalated clay in the mixtures were 0 wt. % (Comparative Sample 3), 3 wt. % (Example 4), 5 wt. % (Example 5), 10 wt. % (Example 6), and 15 wt. % (Example 7). The amounts of EAA in the mixture were 100 wt. % (Comparative Sample 3), 97 wt. % (Example 4), 95 wt. % (Example 5), 90 wt. % (Example 6), and 85 wt. % (Example 7).

Each mixture was compounded for 10 minutes at 220° C. using a Brabender 60 g bowl mixer operating at 60 rpm mixer speed to form a dispersed-particle composition. The resulting dispersed-particle compositions were pressed on a Carver press between two metal plates at 210° C. into transparent films having a thickness varying from 175 to 225 microns.

The thermo-mechanical properties of the Examples 4-7 dispersed particle compositions and Comparative Sample 3 were evaluated as set forth above with respect to Example 3. The results are shown in Table 2.

TABLE 2

| | Matrix Medium | Intercalated Layered Silicate Loading (wt. %) | Storage Modulus (MPa) at 60° C. |
|---|---|---|---|
| Compar. 3 | EVOH | 0.0 | 469 |
| Example 4 | EVOH | 3.0 | 1250 |
| Example 5 | EVOH | 5.0 | 890 |
| Example 6 | EVOH | 10.0 | 719 |
| Example 7 | EVOH | 15.0 | 297 |

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of various aspects and embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A packaging material comprising a dispersed-particle composition comprising:
   a matrix medium comprising one or more thermoplastic polymers selected from polyolefin, ethylene/vinyl alcohol copolymer, ionomer, vinyl plastic, polyamide, and polystyrene; and
   a plurality of particles dispersed in the matrix medium, the particles comprising:
   silicate platelets; and
   intercalating agent sorbed to the silicate platelets, wherein the intercalating agent comprises one or more phospholipids.

2. The packaging material of claim 1 wherein the one or more phospholipids are selected from one or more of nitrogen-containing phosphoglycerides.

3. The packaging material of claim 1 wherein the one or more phospholipids are selected from one or more of choline glycerophospholipids.

4. The packaging material of claim 1 wherein the one or more phospholipids are selected from one or more of diacyl derivatives of choline glycerophospholipids.

5. The packaging material of claim 1 wherein the one or more phospholipids are selected from one or more phosphatidylcholines.

6. The packaging material of claim 1 wherein the one or more phospholipids are selected from one or more ethanolamine phospholipids.

7. The packaging material of claim 1 wherein the one or more phospholipids are selected from one or more ethanolamine glycerophospholipids.

8. The packaging material of claim 1 wherein the one or more phospholipids are selected from one or more phosphatidylethanolamines.

9. The packaging material of claim 1 wherein the one or more phospholipids are selected from one or more phosphoglycerides represented by the formula:

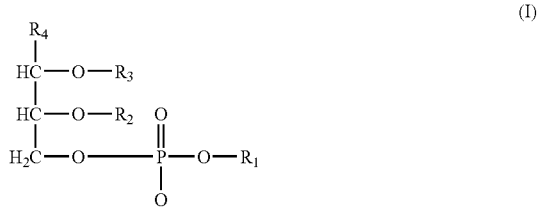

where:
R$_1$ represents a quaternized amino group represented by the formula:

or a sulphur group represented by the formula:

where R$_5$, R$_6$, and R$_7$ each independently represent hydrogen or alkyl of 1 to 4 carbon atoms and n is an integer of from 2 to 6;
R$_2$ and R$_3$ are independently hydrogen, an acyl group having 2 carbon atoms, an alkyl, alkenyl, or alkadienyl group having from 14 to 20 carbon atoms, or the acyl residue of long chain fatty acid, provided that at least one of R$_2$ and R$_3$ is acyl residue of long chain fatty acid; and
R$_4$ is hydrogen, a lower alkyl group, or a lower alkenyl group.

10. The packaging material of claim 1 wherein the plurality of particles have an average size of less than 100 nm in at least one dimension.

11. The packaging material of claim 1 wherein the dispersed-particle composition comprises at least about 0.1% of the particles by weight of the dispersed-particle composition.

12. The packaging material of claim 1 wherein the silicate platelets are derived from bentonite clay.

13. The packaging material of claim 1 wherein:
the packaging material comprises a packaging film comprising at least one layer comprising the dispersed-particle composition; and the at least one layer comprises at least about 50% by weight of the at least one layer of the one or more thermoplastic polymers.

14. The packaging material of claim 1 wherein: the packaging material comprises a tray comprising the dispersed-particle composition.

15. The packaging material of claim 1 comprising a bottle or container comprising the dispersed-particle composition.

16. The packaging material of claim 1 wherein the one or more thermoplastic polymers comprises polyolefin.

17. The packaging material of claim 1 wherein the one or more thermoplastic polymers comprises ethylene/vinyl alcohol copolymer.

18. The packaging material of claim 1 wherein the one or more thermoplastic polymers comprises ionomer.

19. The packaging material of claim 1 wherein the one or more thermoplastic polymers comprises vinyl plastic.

20. The packaging material of claim 1 wherein the one or more thermoplastic polymers comprises polyamide.

21. The packaging material of claim 1 wherein the one or more thermoplastic polymers comprises polystyrene.

22. The packaging material of claim 1 wherein the silicate platelets exclude synthetic mica.

23. A packaging material comprising a dispersed-particle composition comprising:
a matrix medium comprising one or more thermoplastic polymers; and
a plurality of particles dispersed in the matrix medium, the particles comprising:
silicate platelets; and
intercalating agent sorbed to the silicate platelets, wherein the intercalating agent comprises one or more phospholipids selected from one or more of (i) monoacyl derivatives of choline glycerophospholipids, (ii) 1-lysophosphatidylcholines and 2-lysophosphatidylcholines, (iii) choline plasmalogens, (iv) sulphur-containing phosphoglycerides, and (v) sulfocholine glycerophospholipids.

24. The packaging material of claim 23 wherein the one or more phospholipids are selected from one or more of monoacyl derivatives of choline glycerophospholipids.

25. The packaging material of claim 23 wherein the one or more phospholipids are selected from one or more of 1-lysophosphatidylcholines and 2-lysophosphatidylcholines.

26. The packaging material of claim 23 wherein the one or more phospholipids are selected from one or more of choline plasmalogens.

27. The packaging material of claim 23 wherein the one or more phospholipids are selected from one or more sulphur-containing phosphoglycerides.

28. The packaging material of claim 23 wherein the one or more phospholipids are selected from one or more sulfocholine glycerophospholipid.

* * * * *